United States Patent
Masaki

[11] Patent Number: 6,131,791
[45] Date of Patent: Oct. 17, 2000

[54] SOLDERING AND DESOLDERING DEVICE WITH IMPROVED PICKUP DEVICE

[75] Inventor: Hiroyuki Masaki, Osaka, Japan

[73] Assignee: Hakko Corporation, Japan

[21] Appl. No.: 09/455,037

[22] Filed: Dec. 6, 1999

[51] Int. Cl.[7] .......................... B23K 1/018; B23K 31/02
[52] U.S. Cl. ...................... 228/4.1; 228/20.5; 228/119; 228/264
[58] Field of Search ................... 228/49.1, 44.7, 228/49.5, 20.1, 20.5, 119, 264, 4.1

[56] References Cited

U.S. PATENT DOCUMENTS

| | | | |
|---|---|---|---|
| 3,561,662 | 2/1971 | Duhaime et al. | 228/20 |
| 3,604,610 | 9/1971 | Fortune | 228/20 |
| 3,818,539 | 6/1974 | Fortune | 15/341 |
| 3,862,468 | 1/1975 | Fortune | 15/341 |
| 3,912,149 | 10/1975 | Fortune | 228/20 |
| 3,921,249 | 11/1975 | Fortune | 15/341 |
| 3,965,608 | 6/1976 | Schuman | 43/110 |
| 3,987,954 | 10/1976 | Litt | 228/20 |
| 4,178,496 | 12/1979 | Fortune | 219/230 |
| 4,187,973 | 2/1980 | Fortune | 228/20 |
| 4,221,017 | 9/1980 | Fortune | 15/344 |
| 4,274,176 | 6/1981 | Undin et al. | 15/341 |
| 4,285,091 | 8/1981 | Fortune | 15/310 |
| 4,292,706 | 10/1981 | Fortune | 15/341 |
| 4,528,746 | 7/1985 | Yoshimura . | |
| 4,659,004 | 4/1987 | Fridman | 228/6.2 |
| 4,723,353 | 2/1988 | Monforte | 29/568 |
| 4,767,047 | 8/1988 | Todd et al. | 228/6.2 |
| 4,773,582 | 9/1988 | Vella | 228/20 |
| 4,860,438 | 8/1989 | Chen | 29/740 |
| 4,997,121 | 3/1991 | Yoshimura . | |
| 5,135,153 | 8/1992 | Hooriani | 228/20 |
| 5,195,235 | 3/1993 | Mifuji | 29/721 |
| 5,280,668 | 1/1994 | Fortune | 15/415.1 |
| 5,560,531 | 10/1996 | Ruszowski | 228/19 |
| 5,890,646 | 4/1999 | Tang et al. . | |

*Primary Examiner*—Patrick Ryan
*Assistant Examiner*—Kiley Stoner

[57] ABSTRACT

A soldering and desoldering device incorporates a vacuum pickup device that assists the user in engaging mounted components for removal or in positioning and installing components. The device comprises a handpiece, a hot air tube extending from one end of the handpiece, and a vacuum pickup tube that extends through the hot air tube and a portion of the handpiece. An adjustment control protrudes from the handpiece and allows a user to control the position of the vacuum pickup tube via a sliding member coupled to the vacuum pickup tube. One or more springs disposed around the vacuum pickup tube are stretched or compressed to absorb excess force applied to the vacuum pickup tube and act to assist a user in mounting or dismounting a component from a substrate.

22 Claims, 8 Drawing Sheets

SOLDERING AND DESOLDERING DEVICE WITH IMPROVED PICKUP DEVICE

BACKGROUND OF THE INVENTION

1. Field of the Invention

The present invention relates to soldering and desoldering devices, and more particularly, to a device that uses an improved pickup device for soldering or desoldering an item such as an electrical component.

2. Description of Related Art

It is commonly known to solder components together or to remove a component by desoldering. A common application is to solder (or mount) electrical components to a printed circuit board or to remove (or dismount) an electrical component by desoldering. The electrical components are usually soldered to the printed circuit board so that the electrical components are in an electrically conductive relationship with each other in order to form electrical circuits. The electrical components once soldered to the printed circuit board, also occasionally have to be removed from the printed circuit board, because of a defect therein or an incorrect arrangement, by melting the soldered portions and dismounting the electrical component from the printed circuit board.

A conventional method of dismounting an electrical component, such as an integrated circuit (IC) having a plurality of leads that are soldered to the corresponding conductive portions printed on the circuit board, comprises melting the solder at each of the leads with a soldering iron and picking out each lead with a pair of tweezers or the like one by one until the entire IC is completely removed from the board. This conventional method is disadvantageous in that because an IC has many soldered leads, considerable manual work is required to dismount the IC. Also, because the leads are short and fragile, the dismounting work is delicate and requires a great deal of skill. Mechanical damage to the body and leads of an IC is common and the heat involved in the melting of the solder by this laborious method may also adversely affect the functions of the IC or printed circuit board.

A more advanced method for installing or removing electrical components to or from a printed circuit board comprises an apparatus that includes a vacuum pickup device. The apparatus uses a vacuum tube with a suction cup on its end which can extend axially through the heating head of the apparatus to attach to the electrical component that is to be placed on or removed from the printed circuit board. The axial movement of the suction cup is controlled by the user via a manual turnable knob. The successful operation of this device depends to a certain extent on the user's correct operation of the turnable knob. For example, if the suction cup is lifted too early when attempting to remove a component, the solder will not have sufficiently liquefied and the component may be damaged, such as the leads being bent, or the suction cup may detach from the component. If the suction cup is lifted too late, the solder may have resolidified resulting similarly in component damage or suction cup detachment when the user attempts to remove the component. Additionally, the component may be damaged by the user pressing the suction cup and vacuum tube too hard against the component when attaching the suction cup to the component.

Various devices have been introduced in an attempt to eliminate these problems. These devices typically utilize a spring to assist the user in controlling the force applied to the suction cup. For example, one type of device has the vacuum pickup tube acted on by a spring in the direction toward the component to provide a resilient cushion against which the pickup tube can be displaced when contact is made with the component. This prevents the component from being damaged by too great a downward force applied by the user. However, this device can cause problems when attempting to install a component by applying too great a force to the component which results in defective solder connections due to leads splashing or passing through the solder incorrectly.

Another type of device has the vacuum pickup tube held in a raised position by a coil spring with the user lowering the pickup tube against the action of the spring until contact is made with the component. The vacuum then holds the suction cup to the component and the user can remove the applied pressure and concentrate on melting the solder. When the solder melts, the spring is applying the correct pressure and automatically lifts the component from the printed circuit board at the precise moment. However, this device is not effective for installing components because the spring is counterproductive to the user's efforts.

A third type of device attempts to combine the features of the above-mentioned two devices, by incorporating the spring from each device. The vacuum pickup tube is clamped to a slide bracket that slides on a slide rod fixed to an inner wall of the device. The slide bracket is positioned between two springs disposed around the slide rod and centered within a rack member that has teeth that engage a gear wheel that rotates when the user turns the external vacuum pickup adjustment knob. The springs position the suction cup of the vacuum pickup device in a neutral position in an attempt to achieve the advantages of the prior two devices. When attaching the suction cup to a component, additional force by the user after component engagement results in compression of one of the springs. After attaching the suction cup to the component for dismounting, the user can apply upward spring loading to the other spring by turning the adjustment knob so that when the solder is melted the spring automatically lifts the component from the printed circuit board. However, this device has many small parts that make it difficult to assemble, manufacture, and repair. Furthermore, design shortcomings and numerous moving parts make it difficult to operate.

Accordingly, it would be desirable to provide a soldering and desoldering device that incorporates a vacuum pickup device that assists the user in engaging mounted components for removal or in positioning and installing components. The device may be handheld or stationary and allows a user to properly engage components or dismount a component by automatically lifting the component once the solder has melted. Furthermore, the device would be easy to assemble, manufacture, and repair and would be easy to use and operate.

SUMMARY OF THE INVENTION

In accordance with the teachings of the present invention, a soldering and desoldering device is provided. The device comprises a handpiece, a hot air tube extending from one end of the handpiece, and a vacuum pickup tube that extends through the hot air tube and a portion of the handpiece. An adjustment control protrudes from the handpiece and allows a user to control the position of the vacuum pickup tube via a sliding member coupled to the vacuum pickup tube. One or more springs disposed around the vacuum pickup tube are stretched or compressed to absorb excess force applied to the vacuum pickup tube and act to assist a user in mounting or dismounting a component from a substrate.

A more complete understanding of the soldering and desoldering device will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a soldering and desoldering device that assists the user in mounting and dismounting components. The device would also be easy to manufacture and repair and be simple to operate. In the detailed description that follows, it should be appreciated that like reference numerals are used to identify like elements illustrated in one or more of the figures.

Figure 1:
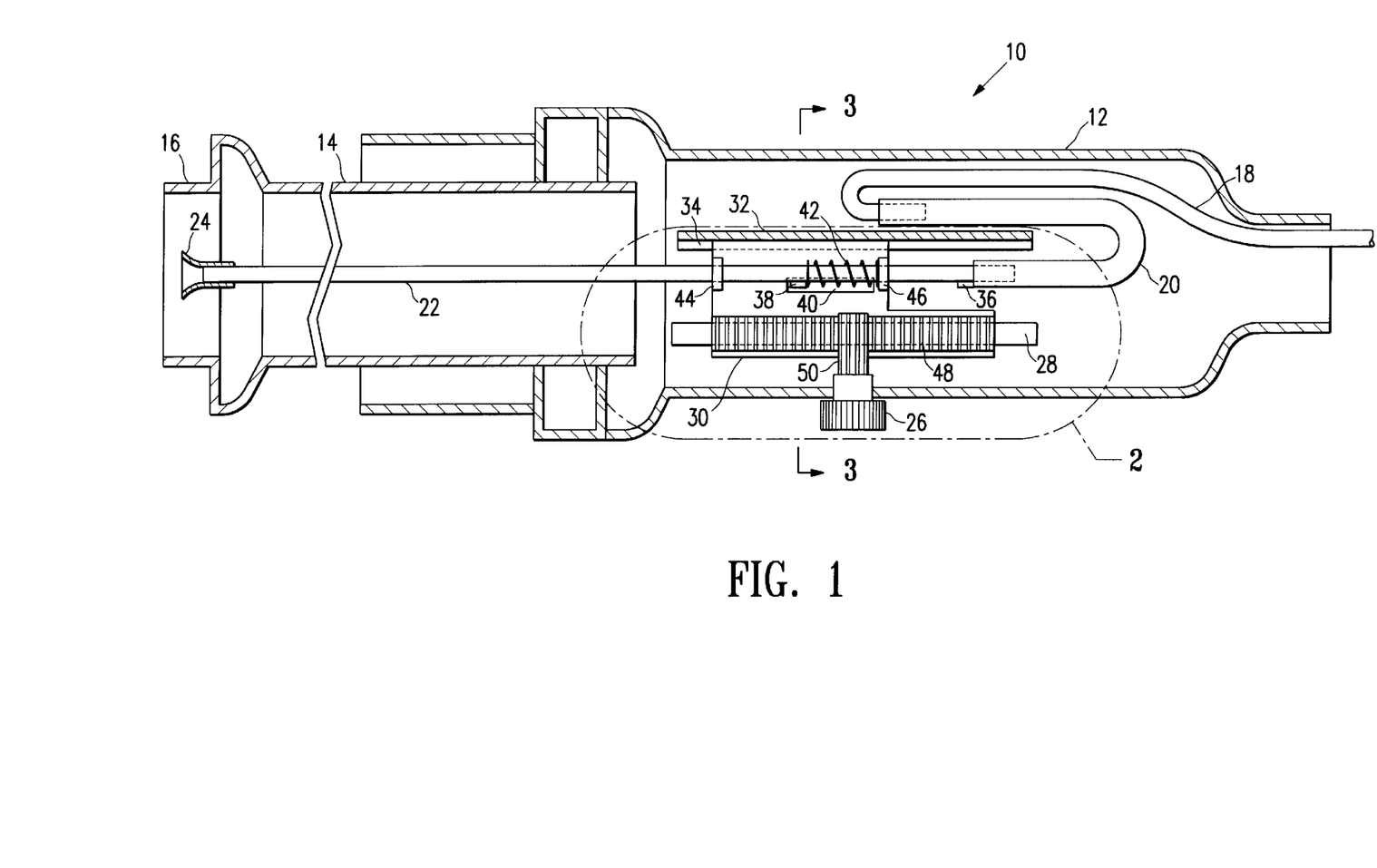
FIG. 1 is a cross-sectional view of a soldering and desoldering device in accordance with a first embodiment of the present invention.

Referring first to FIG. 1, a soldering and desoldering device 10 in accordance with a first embodiment of the present invention is illustrated. The device 10 is shown as a handheld in-line model, but could accordingly have been shown as a pistol-grip model or as various other types of conventional designs. Furthermore, except for particular aspects of the vacuum pickup device discussed below, this device may be of any conventional design such as Model 850 Hot Air Rework System sold by the assignee of the present application. Accordingly, a detailed description of known features of the apparatus will not be provided such as how air is heated to melt the solder, how the air temperature is controlled or monitored, the operation of various switches such as vacuum or heat, various modes of operation, etc., because these features are known and will not directly affect the features of the present invention and also will vary depending upon the particular type of device that incorporates the features of the present invention.

The device 10 has a handpiece section 12 that allows a user to hold and control the device 10 and that contains and supports many of the components of the device 10. A hot air tube 14 extends from the handpiece section 12 and upon one end of the hot air tube 14 is mounted a nozzle 16. A vacuum line 18 enters the handpiece section 12 at one end and connects to a vacuum connection tube 20 that slides onto a vacuum pickup tube 22 until it reaches a tab 36 that prevents further travel. The vacuum connection tube 20 is very flexible and allows the vacuum pickup tube 22 to move freely along an axis of the device 10. The vacuum pickup tube 22 continues through the hot air tube 14 to the nozzle 16. A suction cup 24 is attached at one end of the vacuum pickup tube 22, with the suction cup 24 having an opening to allow air to be drawn into the vacuum pickup tube 22 and to assist in attaching the suction cup 24 to components and creating a vacuum seal to the surface of a component.

Figure 2:
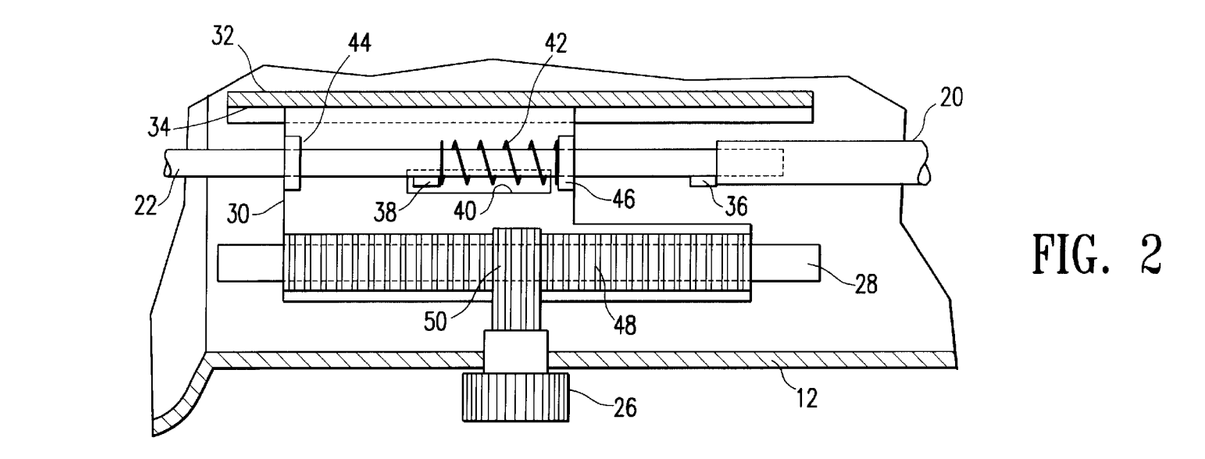
FIG. 2 is an expanded cross-sectional view of a soldering and desoldering device taken of the dashed section 2 of FIG. 1.

An adjustment knob 26 allows a user to control, to a certain extent, the movement of the vacuum pickup tube 22 and, consequently, the position of the suction cup 24 relative to the opening of the nozzle 16. As shown in FIG. 1 and in the expanded cross-sectional view in FIG. 2, taken of the dashed section 2 of FIG. 1, the adjustment knob 26 rotates a gear wheel 50 that engages a series of teeth 48 on a sliding member 30. The sliding member 30 slides along a surface 28 and within a channel 34 of a support surface 32. A set of guiding members 44 and 46, on the sliding member 30, position and direct the vacuum pickup tube 22 relative to the sliding member 30, but the guiding members 44, 46 allow the vacuum pickup tube 22 to slide freely through or between the guiding members 44, 46. A tab 38 is attached to the vacuum pickup tube 22 and acts to position a spring 42, that is disposed around the vacuum pickup tube 22, between the tab 38 and the guiding member 46. The tab 38 is allowed to move within a channel 40 of the sliding member 30.

Figure 3:
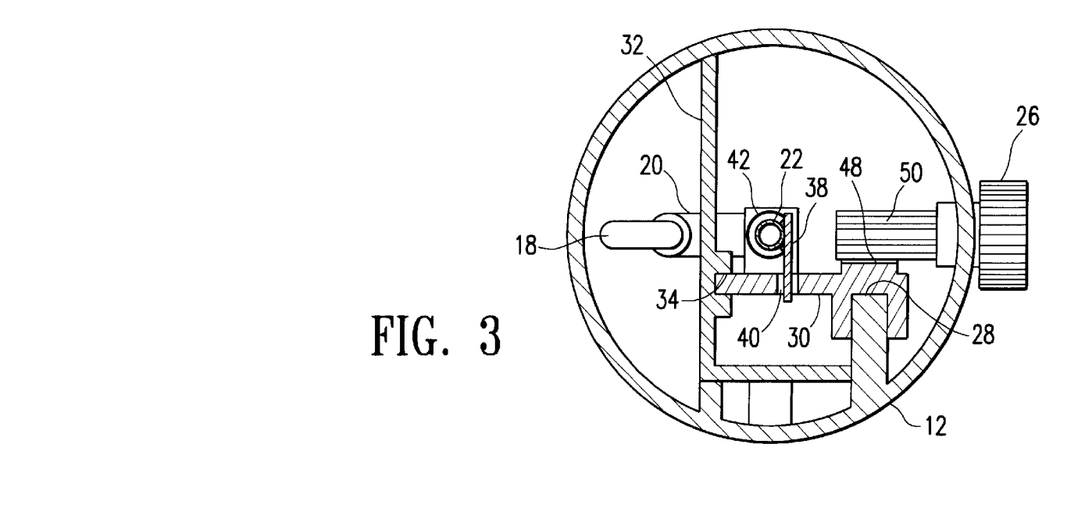
FIG. 3 is a cross-sectional view of a soldering and desoldering device taken through the section 3—3 of FIG. 1.

FIG. 3 is a cross-sectional view taken through the section 3—3 of FIG. 1 that illustrates certain features in accordance with an embodiment of the present invention. The channel 40, which is shown as a cutout, allows the tab 38 to freely slide to a certain extent with the vacuum pickup tube 22. The channel 40 may alternatively be a groove rather than a cutout, depending upon the size of the tab 38. The channel 34 within the support surface 32 and the surface 28 are also clearly visible. The channel 34 and the surface 28 guide and support the sliding member 30 as it moves along an axis of the device 10.

In operation, if the user desires to dismount a component from a substrate such as a printed circuit board, the user would rotate the adjustment knob 26 to lower the suction cup 24 to the component. The rotation of the knob in the correct direction, to the right as shown in FIG. 1, moves the sliding member 30 in the direction of the suction cup 24. The guiding member 46 exert a force on the spring 42, which transfers this force to the tab 38, resulting in the vacuum pickup tube 22 moving with the sliding member 30. When the suction cup 24 engages the component, additional force applied by the user, either in pressing down on the device 10 towards the component or in further rotations of the adjustment knob 26, results in the compression of the spring 42 between the tab 38 and the guiding member 46, with very little if any further movement of the pickup tube 22 and the suction cup 24 towards the component. Therefore, the spring 42 absorbs the excess force and helps to prevent possible damage to the component.

When the user rotates the adjustment knob 26 in the opposite direction than from above, the sliding member 30 applies the force to the tab 38 at the one end of the channel 40, resulting in the vacuum pickup tube 22 moving along with the sliding member 30. Thus, the rotation of the adjustment knob causes the suction cup 24 to withdraw into the nozzle 16.

Figure 4:
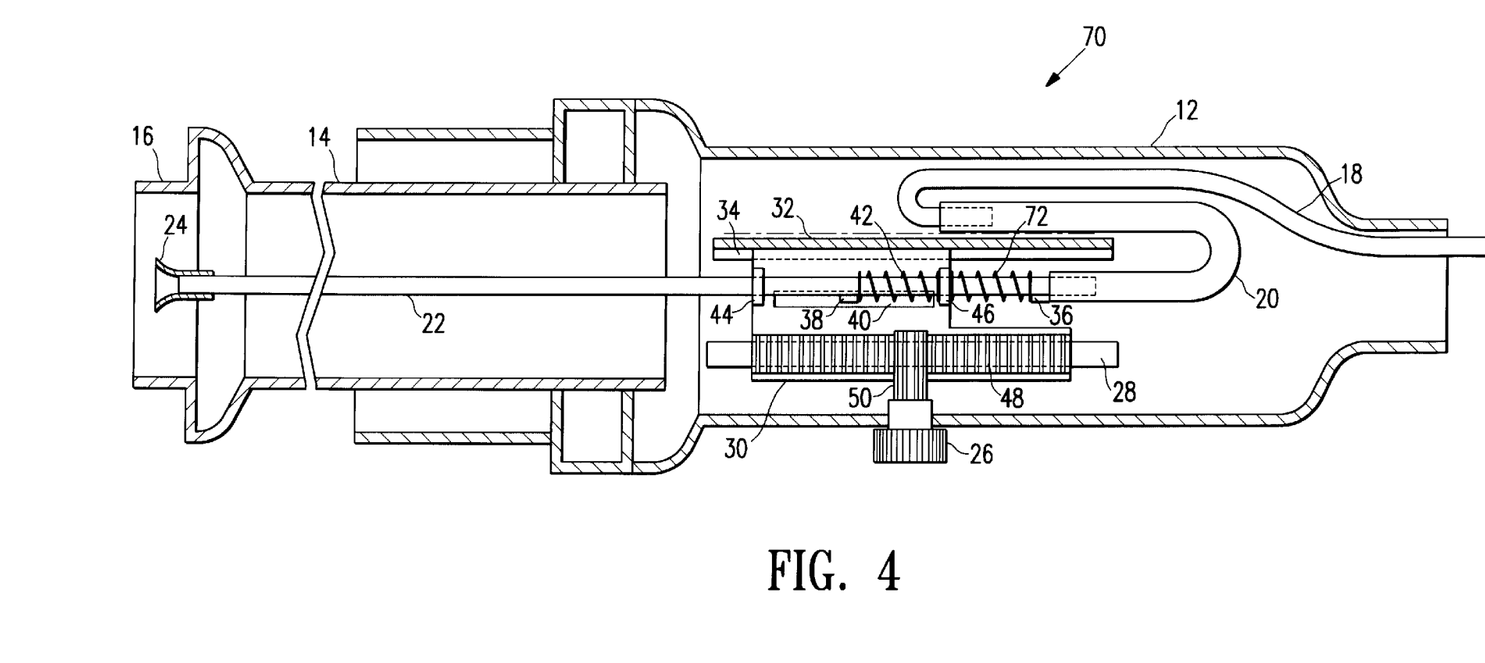
FIG. 4 is a cross-sectional view of a soldering and desoldering device in accordance with a second embodiment of the present invention.

FIG. 4 shows a cross-sectional view of a soldering and desoldering device 70 in accordance with a second embodiment of the present invention. The device 70 is similar to the device 10, but includes a spring 72 disposed around the vacuum pickup tube 22 and situated between the tab 36 and the guiding member 46. The spring 72 does not interfere with the attachment of the suction cup 24 to a component, as discussed above for the device 10. The spring 72 assists in the removal of a component once the suction cup 24 is attached. The user can turn the adjustment knob 26 to apply a spring loading by compressing the spring 72 between the tab 36 and the guiding member 46. The vacuum pickup tube 22 and the suction cup 24 will exert sufficient suction to remain affixed to the component, but when the solder melts, the spring 72 will automatically lift the component free of the substrate. The channel 40 may be extended to allow sufficient movement of the tab 38 affixed to the vacuum pickup tube 22 and may allow the vacuum pickup tube 22 to be positioned based on the spring tension of the springs 42, 72.

Figure 5:
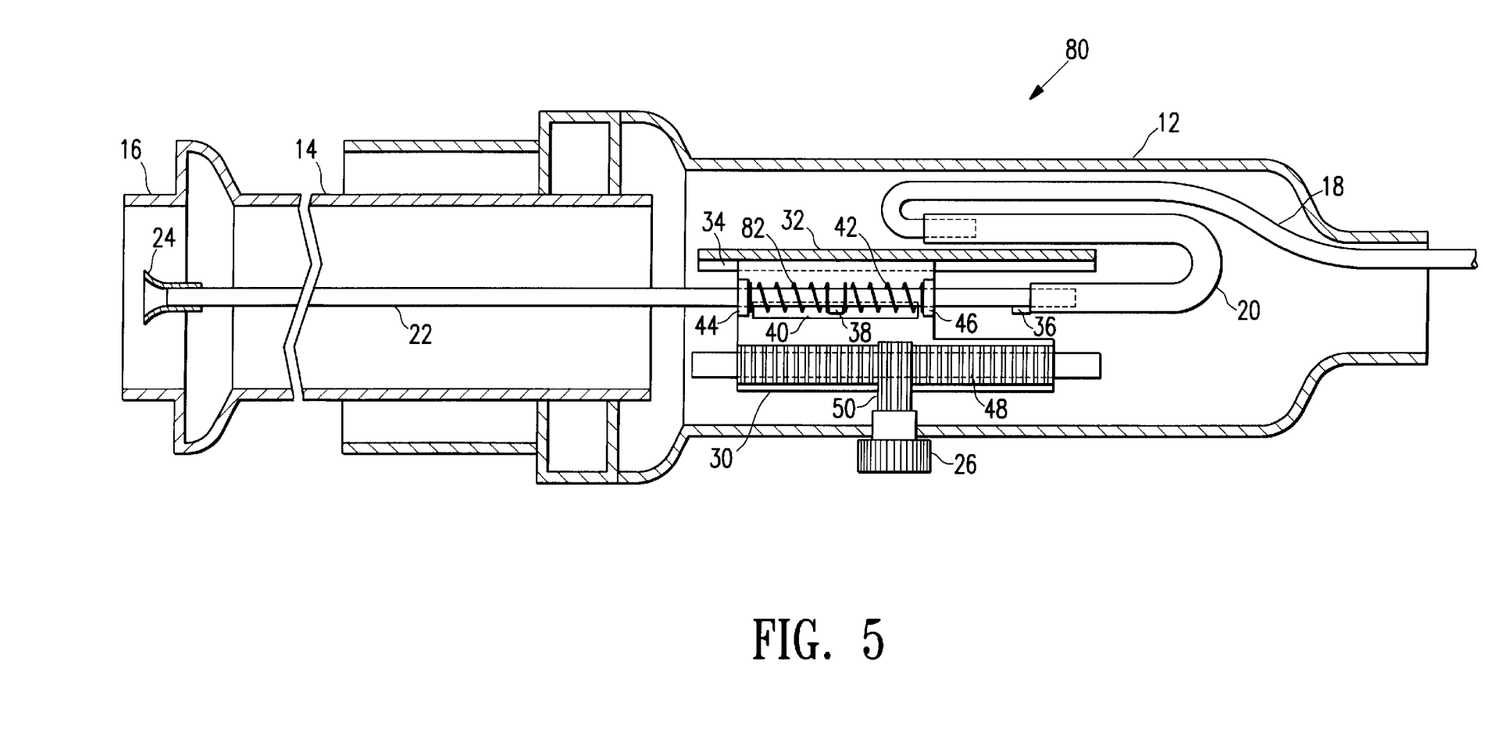
FIG. 5 is a cross-sectional view of a soldering and desoldering device in accordance with a third embodiment of the present invention.

FIG. 5 shows a cross-sectional view of a soldering and desoldering device 80 in accordance with a third embodiment of the present invention. The device 80 is similar to the device 10, but includes a spring 82 disposed around the vacuum pickup tube 22 and situated between the tab 38 and the guiding member 44. The channel 40 has also been extended so that the tab 38 can travel almost the entire length of the sliding member 30 between the guiding members 44, 46. The springs 42, 82 suspend the vacuum pickup tube 22 between the guiding members 44, 46 via the tab 38 between the springs 42, 82.

In operation, when the user is lowering the suction cup 24 to attach to a component, the spring 42 will compress between the guiding member 46 and the tab 38 to absorb the excess force once contact has been made with the component and, therefore, prevent possible damage to the component. When the user is attempting to remove the component from the printed circuit board, the excess force either by lifting the device 80 or through the adjustment knob 26 will compress the spring 82 between the guiding member 44 and the tab 38 so that the spring 82 absorbs the excess force. The user may preload the spring 82 so that the moment the solder is sufficiently melted, the spring 82 will automatically lift the component from the printed circuit board.

Figure 6:
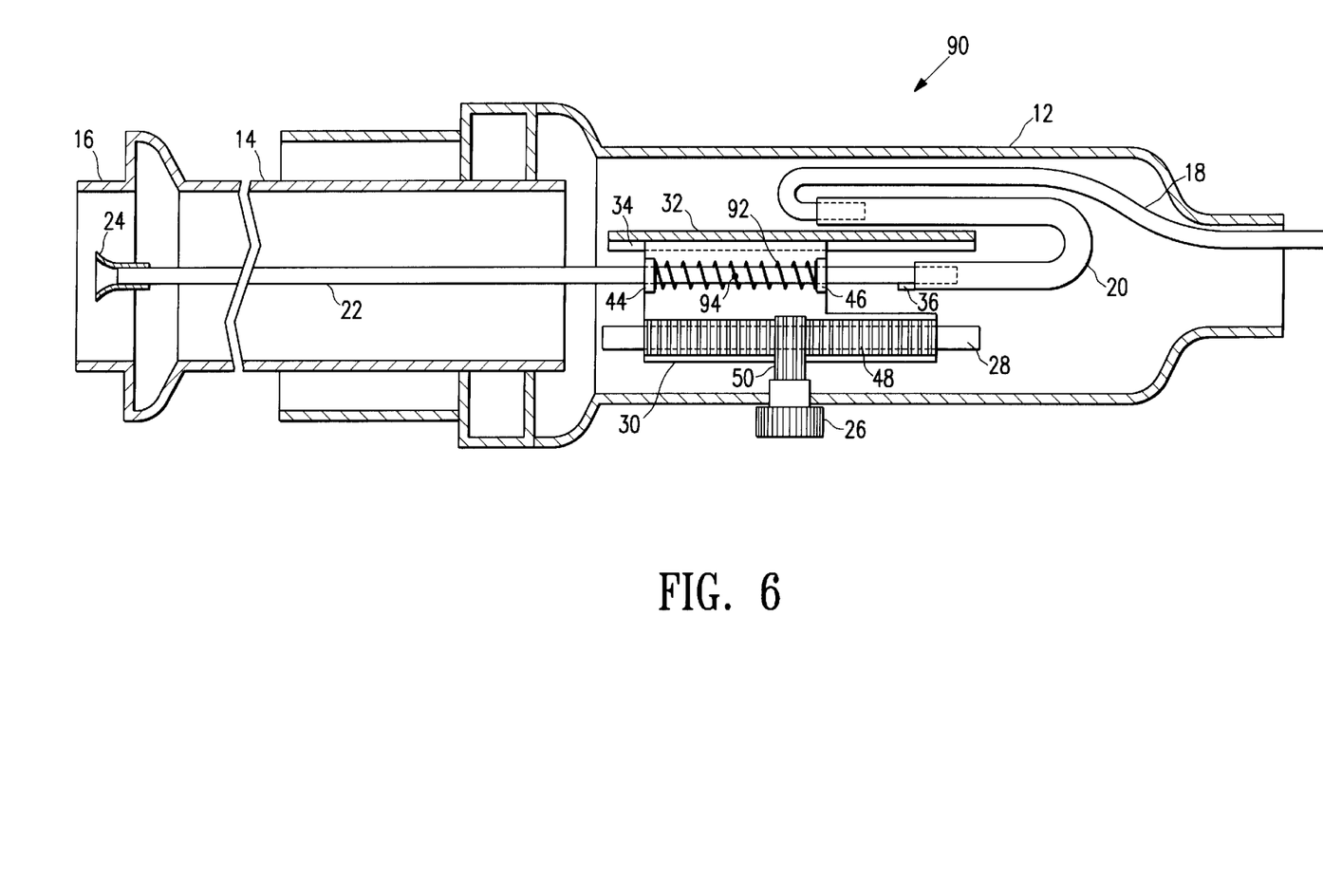
FIG. 6 is a cross-sectional view of a soldering and desoldering device in accordance with a fourth embodiment of the present invention.

FIG. 6 shows a cross-sectional view of a soldering and desoldering device 90 in accordance with a fourth embodiment of the present invention. The device 90 is similar to the device 80, but the tab 38 and the channel 40 are eliminated and the springs 42, 82 are replaced with a spring 92. The spring 92 is disposed around the vacuum pickup tube 22 and between the guiding members 44, 46. The spring 92 is also attached at approximately a midpoint 94 of the spring 92 to the vacuum pickup tube 22. The attachment can be by a spot weld, glue, etc., or the spring may merely be restricted at that point by the attachment of small perturbations or tabs to the vacuum pickup tube 22 that prevent the spring 92 from moving at its midpoint 94. Alternatively, the spring 92 may be restricted at some relative distance from the midpoint 94 to allow the relative amount of travel and spring force to be different in one direction of movement relative to the other direction of movement. Another alternative would be to apply a preloading force to the spring in one direction and then attach the midpoint 94 of the spring 92 to the vacuum pickup tube 22 so that a preloading force would be present to the vacuum pickup tube 22 in the respective direction of the preloading.

The device 90 will operate, similarly to the device 80 discussed above, such that when attaching the suction cup 24 to a component, the excess force will be absorbed by the spring 92 by compressing the portion of the spring 92 between the midpoint 94 and the guiding member 46. When the user is removing a component from the printed circuit board, the spring 92 will also absorb the excess lift by compressing the portion of the spring 92 between the midpoint 94 and the guiding member 44.

Figure 7:
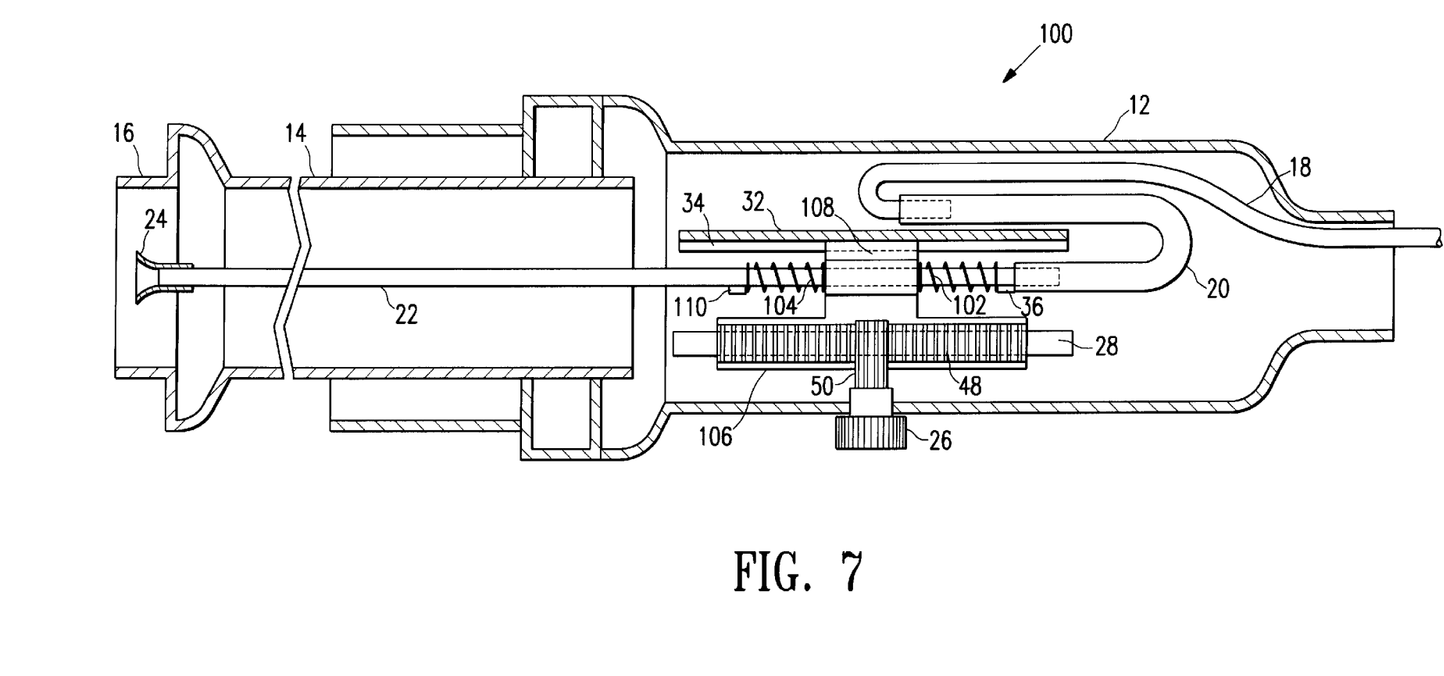
FIG. 7 is a cross-sectional view of a soldering and desoldering device in accordance with a fifth embodiment of the present invention.

FIG. 7 shows a cross-sectional view of a soldering and desoldering device 100 in accordance with a fifth embodiment of the present invention. The device 100 is somewhat similar to the device 80, but most significantly the sliding member 30 has been modified. The device 100 replaces the sliding member 30 with a sliding member 106. The sliding member 106 retains the series of teeth 48 that engage the gear wheel 50 controlled by the adjustment knob 26 and also still slides on the surface 28 and within the channel 34 of the support surface 32. The sliding member 106 has a portion 108 that extends across to slide within the channel 34 and which encompasses a section of the vacuum pickup tube 22. A spring 102 is disposed around the vacuum pickup tube 22 and between the tab 36 and the portion 108 of the sliding member 106. A spring 104 is also disposed around the vacuum pickup tube 22 and between a tab 110 and the portion 108 of the sliding member 106. The portion 108 positions and directs the vacuum pickup tube 22 relative to the direction transmitted through the sliding member 106 via the adjustment knob 26, but the portion 108 allows the pickup tube 22 to slide freely through the portion 108.

In operation, a user directs the relative movement, to a certain extent, of the pickup tube 22 by using the adjustment knob 26. If the user is attaching the suction cup 24 to a component, the excess force will be absorbed by the spring 104 by being compressed between the portion 108 and the tab 110. When the user is removing a component from the printed circuit board, the spring 102 will absorb the excess lift by being compressed between the portion 108 and the tab 36.

Figure 8:
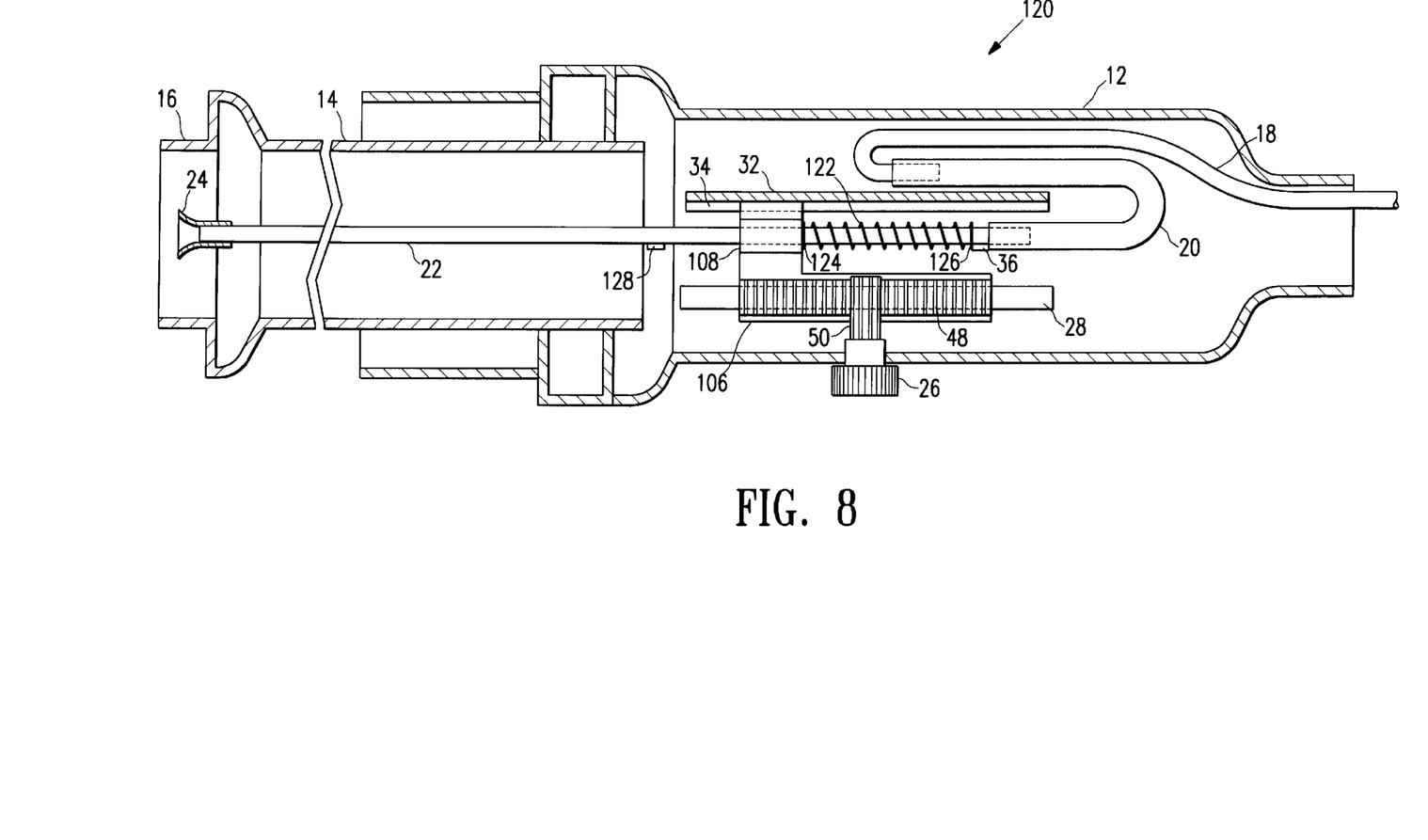
FIG. 8 is a cross-sectional view of a soldering and desoldering device in accordance with a sixth embodiment of the present invention.

FIG. 8 shows a cross-sectional view of a soldering and desoldering device 120 in accordance with a sixth embodiment of the present invention. The device 120 is similar to the device 100, but the device 120 utilizes only a single spring 122. The spring 122 is disposed around the vacuum pickup tube 22 and between the tab 36 and the portion 108 of the sliding member 106. The spring 122 is also connected at each of its ends 124, 126 to the portion 108 and the tab 36, respectively. The end 124 of the spring 122 can be attached to the portion 108 by gluing, crimping, welding, etc., and likewise for the end 126 attached to the tab 36. As above, the portion 108 allows the vacuum pickup tube 22 to move freely through the portion 108 and also directs and positions the vacuum pickup tube 22 within the device 120.

In operation, when a user directs the movement of the suction cup 24 by turning the adjustment knob 26, this action is directed through the gear wheel 50, to the series of teeth 48, so that sliding member 106 with the portion 108 exerts a force on the spring 122, which transmits this to the tab 36 that is directed to the vacuum pickup tube 22. If the user desires to attach the suction cup 24 to a component, any excess force will be absorbed by the spring 122 by being stretched between the tab 36 and the portion 108. When the user is removing a component from the printed circuit board, the spring 122 will absorb the excess lift by being compressed between the portion 108 and the tab 36.

As an alternative embodiment, a tab 128 could be located on the opposite side of the portion 108 relative to the tab 36. The spring 122 would then be disposed between the tab 128 and the portion 108 with one end of the spring 122 connected to the tab 128 and the other end of the spring connected to the portion 108. In operation the action of the spring 122 will be opposite from that described for the sixth embodiment. For example, when attaching the suction cup 24 to a component, any excess force applied to the suction cup 24 in the direction towards the portion 108 will be absorbed by the spring 122 by being compressed between the tab 128 and the portion 108. When removing a component from the printed circuit board, any excess force applied to the suction cup 24 in the direction away from the portion 108 will be absorbed by the spring 122 by being stretched between the tab 128 and the portion 108.

Figures 9, 10:
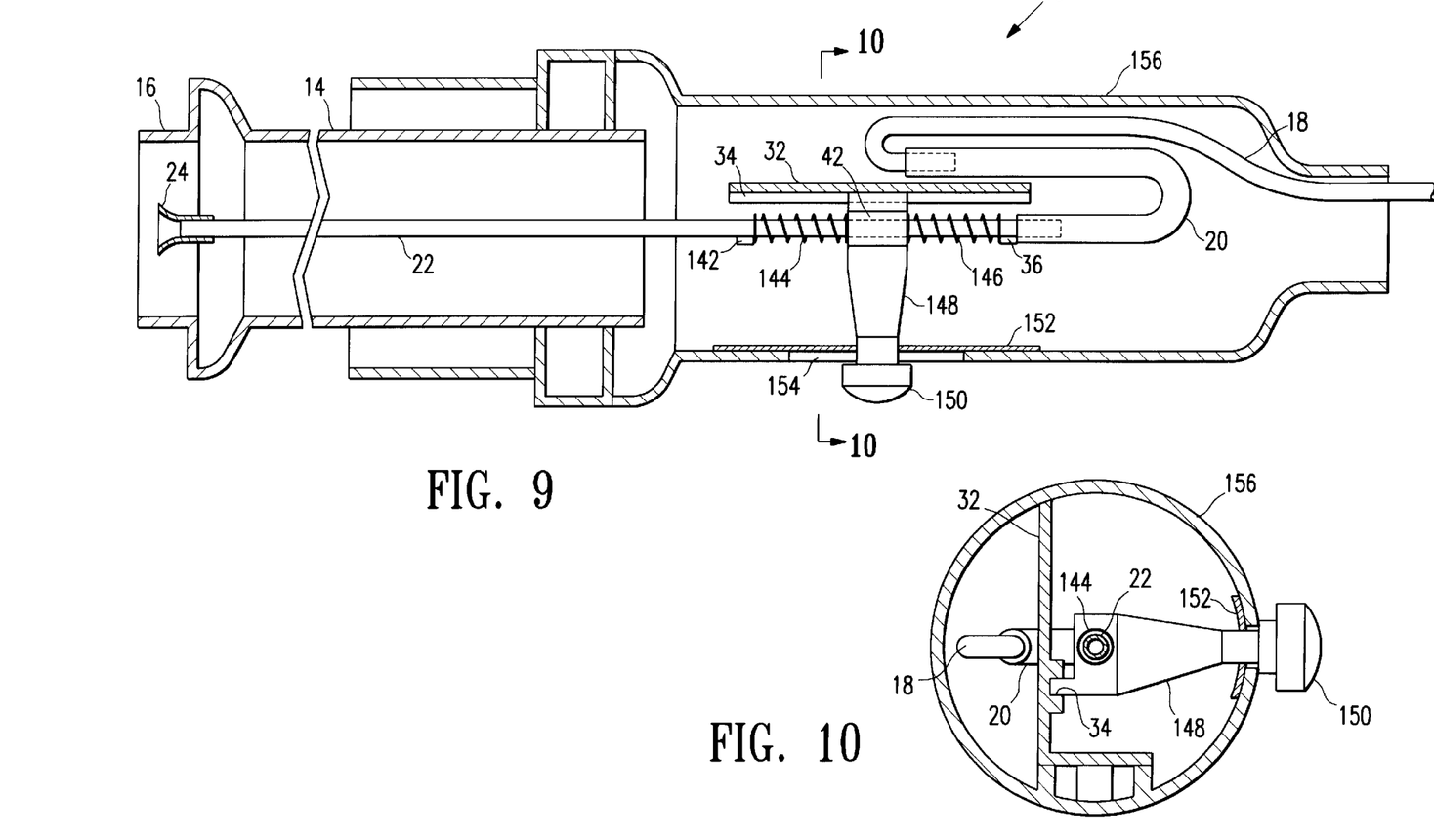
FIG. 9 is a cross-sectional view of a soldering and desoldering device in accordance with a seventh embodiment of the present invention.
FIG. 10 is a cross-sectional view of a soldering and desoldering device taken through the section 10—10 of FIG. 9.

FIG. 9 shows a cross-sectional view of a soldering and desoldering device 140 in accordance with a seventh embodiment of the present invention. The device 140 is similar to the device 100, but the adjustment knob 26 and the sliding member 106 have been eliminated. The device 140 includes a support arm 148 that slides within a channel 154 in the handpiece section 156 and within the channel 34 and encompasses a section of the vacuum pickup tube 22. At one end of the support arm 148 is attached a control knob 150 to allow a user to easily slide the support arm 148 along the channel 154. The support arm 148 also includes a dust cover 152 that covers the opening of the channel 154 to prevent dust and debris from falling within the device 140 through the channel 154.

FIG. 10 is a cross-sectional view taken through the section 10—10 of FIG. 9 that illustrates certain features in accordance with an embodiment of the present invention. The support arm 148 slides within the channel 154 and the channel 34, controlled by a user via the control knob 150. The dust cover 152 is attached to the support arm 148 and is of sufficient length and width to adequately cover the channel 154 during the entire range of movement along the channel 154 to prevent foreign objects from falling into the device 140 through the channel 154.

As can be seen in FIG. 9, a spring 144 and a spring 146 are disposed around the vacuum pickup tube 22. The spring 144 is located between a tab 142 on the vacuum pickup tube 22 and the support arm 148, while the spring 146 is located between the tab 36 and the support arm 148. In operation, excess force applied when attaching the suction cup to a component will be absorbed by the spring 144 being compressed between the tab 142 and the support arm 148. Excess force applied when removing a component will be absorbed by the spring 146 being compressed between the tab 36 and the support arm 148. A user will control the direction of the suction cup 24 by sliding the control knob 150 in the desired direction. For example, if the user wishes to extend the suction cup 24 away from the device 140, the user would slide the control knob 150 in that direction. This results in the support arm 148 applying a force to the spring 144, which transfers the force to the tab 142 attached to the vacuum pickup tube 22, so that a directional force is applied through the vacuum pickup tube to the suction cup 24 in the user's desired direction. Similarly, if the user wishes to draw the suction cup 24 within the device 140, the user would slide the control knob 150 in that direction (away from the nozzle) so that the support arm 148 applies a force to the spring 146, which transfers this force to the tab 36 attached to the vacuum pickup tube 22. As discussed above, excess force in either direction will be absorbed to a certain extent by the corresponding spring.

The control knob 150 and possibly the support arm 148 may be incorporated into any of the above-discussed embodiments in order to replace the adjustment knob 26 and possibly the sliding member 30 or sliding member 106. Additionally, the embodiments may be combined based on the desired operation. For example, if the operation of the control knob 150 is preferred over the adjustment knob 26, the control knob 150 may function to move the sliding member 30 or sliding member 106 by connecting the control knob 150 to the sliding member 30 (or 106) and function, similar to above, by sliding along the channel 154. Thus, the control knob 150 and possibly the support arm 148 may simplify the complexity of the prior embodiments. Furthermore, because the motion of the control knob 150 translates directly to the user's desired motion of the suction cup 24, this may eliminate any confusion that may occur in the prior embodiments as to which direction is the correct direction for rotating the adjustment knob 26 to achieve the desired movement of the suction cup 24.

Having thus described preferred embodiments of the soldering and desoldering device, it should be apparent to those skilled in the art that certain advantages of the within system have been achieved. It should also be appreciated that various modifications, adaptations, and alternative embodiments thereof may be made within the scope and spirit of the present invention. For example, one or more springs have been illustrated to show various embodiments of the present invention, but it should be apparent that the inventive concepts described above would be equally applicable to various other types of materials that exhibit spring-like characteristics, such as compressible bushings or other materials that forcibly attempt to retain their shape, as known in the art. Accordingly, the scope of the invention is intended to be limited and/or defined only by the proper interpretation of the following claims.

What is claimed is:

1. A device for soldering and desoldering a component, comprising:

a handpiece;

a hot air tube extending from one end of said handpiece;

a vacuum pickup tube which extends through at least a portion of said handpiece and through said hot air tube, terminating at a one end outside of said handpiece;

a sliding member coupled to said vacuum pickup tube and adapted to slide within said handpiece, said sliding member substantially controlling the position and movement of said vacuum pickup tube;

an adjustment control coupled to said sliding member and protruding from said handpiece, said adjustment control adapted to allow a user of said device to control the movement of said sliding member;

a first tab coupled to said vacuum pickup tube; and a first spring disposed around said vacuum pickup tube with at least a portion of said first spring being disposed between said first tab and at least a portion of said sliding member, wherein said at least a portion of said first spring absorbs an excessive force applied to said one end of said vacuum pickup tube in a direction toward said handpiece.

2. The device of claim 1, wherein said first spring absorbs said excessive force applied to said one end of said vacuum pickup tube in a direction toward said handpiece by being compressed between said first tab and said at least a portion of said sliding member.

3. The device of claim 1, further comprising:
a second tab coupled to said vacuum pickup tube on the opposite side of said at least a portion of said sliding member relative to said first tab; and
a second spring disposed around said vacuum pickup tube and between said second tab and said at least a portion of said sliding member, wherein said second spring absorbs an excessive force applied to said one end of said vacuum pickup tube in a direction away from said handpiece by being compressed between said second tab and said at least a portion of said sliding member.

4. The device of claim 1, further comprising a second spring disposed around said vacuum pickup tube on the opposite side of said first tab relative to said first spring, said second spring confined between said first tab and another portion of said sliding member, wherein said second spring absorbs an excessive force applied to said one end of said vacuum pickup tube in a direction away from said handpiece by being compressed between said first tab and said another portion of said sliding member.

5. The device of claim 1, wherein said first spring further comprises another portion of said first spring being disposed between said first tab and another portion of said sliding member, said first tab restricting a movement of said first spring, wherein said another portion of said first spring absorbs an excessive force applied to said one end of said vacuum pickup tube in a direction away from said handpiece by being compressed between said first tab and said another portion of said sliding member.

6. The device of claim 5, wherein said first tab restricts a movement of said first spring at approximately a midpoint of the length of said first spring.

7. The device of claim 1, wherein a first end of said first spring is attached to said first tab and a second end of said first spring is attached to said at least a portion of said sliding member, wherein said first spring absorbs an excessive force applied to a one end of said vacuum pickup tube in a direction toward said handpiece by being stretched between said first tab and said at least a portion of said sliding member, and said first spring absorbs an excessive force applied to said one end of said vacuum pickup tube in a direction away from said handpiece by being compressed between said first tab and said at least a portion of said sliding member.

8. The device of claim 1, wherein a first end of said first spring is attached to said first tab and a second end of said first spring is attached to said at least a portion of said sliding member, wherein said first spring absorbs an excessive force applied to a one end of said vacuum pickup tube in a direction toward said handpiece by being compressed between said first tab and said at least a portion of said sliding member, and said first spring absorbs an excessive force applied to said one end of said vacuum pickup tube in a direction away from said handpiece by being stretched between said first tab and said at least a portion of said sliding member.

9. The device of claim 1, wherein said sliding member further comprises a plurality of teeth disposed along a surface of said sliding member, said adjustment control further comprises an adjustment knob having a gear wheel adapted to engage said plurality of teeth, wherein a user of said device controls the movement of said sliding member by rotating said adjustment knob.

10. The device of claim 9, further comprising:
a support that contacts said sliding member and adapted to allow said sliding member to slide along a surface of said support;
a support wall disposed adjacent to said vacuum pickup tube; and
a channel disposed within said support wall and adapted to guide a section of said sliding member as it slides along said channel.

11. The device of claim 1, further comprising:
a suction cup coupled to said one end of said vacuum pickup tube, said suction cup adapted to allow air to be drawn into said vacuum pickup tube; and
a vacuum connection tube coupled to a second end opposite said one end of said vacuum pickup tube, said vacuum connection tube adapted to connect said vacuum pickup tube to an external vacuum source.

12. The device of claim 1, further comprising:
a first channel disposed within said handpiece that said adjustment control protrudes therethrough;
a support wall disposed adjacent to said vacuum pickup tube; and
a second channel disposed within said support wall and adapted to guide a section of said sliding member as it slides along said second channel, wherein a user of said device controls the movement of said sliding member by moving said adjustment control along said first channel.

13. The device of claim 1, wherein said sliding member further comprises a channel disposed adjacent to said vacuum pickup tube, said first tab protrudes within and travels along said channel.

14. A device for soldering and desoldering a component, comprising:
a handpiece;
a hot air tube extending from one end of said handpiece;
a vacuum pickup tube which extends through said hot air tube and at least a portion of said handpiece;
a sliding member coupled to said vacuum pickup tube and adapted to slide within said handpiece, said sliding member substantially controlling the position and movement of said vacuum pickup tube;
an adjustment control coupled to said sliding member and protruding from said handpiece, said adjustment control adapted to allow a user of said device to control the movement of said sliding member;
a first tab coupled to said vacuum pickup tube;
a second tab spaced from said first tab and coupled to said vacuum pickup tube with at least a portion of said sliding member between said first and second tabs; and
means for absorbing excessive forces applied to said vacuum pickup tube, said absorbing means disposed around said vacuum pickup tube, between said first tab and said at least a portion of said sliding member and between said second tab and said at least a portion of said sliding member.

15. The device of claim 14, wherein said sliding member further comprises a plurality of teeth disposed along a surface of said sliding member, said adjustment control further comprises an adjustment knob having a gear wheel adapted to engage said plurality of teeth, wherein a user of said device controls the movement of said sliding member by rotating said adjustment knob.

16. The device of claim 15, further comprising:
a support that contacts said sliding member and adapted to allow said sliding member to slide along a surface of said support;
a support wall disposed adjacent to said vacuum pickup tube; and a channel disposed within said support wall and adapted to guide a section of said sliding member as it slides along said channel.

17. The device of claim 14, further comprising:
a first channel disposed within said handpiece that said adjustment control protrudes therethrough;
a support wall disposed adjacent to said vacuum pickup tube; and
a second channel disposed within said support wall and adapted to guide a section of said sliding member as it slides along said second channel, wherein a user of said device controls the movement of said sliding member by moving said adjustment control along said first channel.

18. A device for soldering and desoldering a component, comprising:
a handpiece;
a hot air tube extending from one end of said handpiece;
a vacuum pickup tube which extends through said hot air tube and at least a portion of said handpiece;
a sliding member coupled to said vacuum pickup tube and adapted to slide within said handpiece, said sliding member substantially controlling the position and movement of said vacuum pickup tube;
an adjustment control coupled to said sliding member and protruding from said handpiece, said adjustment control adapted to allow a user of said device to control the movement of said sliding member;
a first tab coupled to said vacuum pickup tube; and
means for absorbing excessive forces applied to said vacuum pickup tube, said absorbing means disposed around said vacuum pickup tube, between said first tab and a first portion of said sliding member and between said first tab and a second portion of said sliding member.

19. The device of claim 18, wherein said sliding member further comprises a plurality of teeth disposed along a surface of said sliding member, said adjustment control further comprises an adjustment knob having a gear wheel adapted to engage said plurality of teeth, wherein a user of said device controls the movement of said sliding member by rotating said adjustment knob.

20. The device of claim 19, further comprising:
a support that contacts said sliding member and adapted to allow said sliding member to slide along a surface of said support;
a support wall disposed adjacent to said vacuum pickup tube; and
a channel disposed within said support wall and adapted to guide a section of said sliding member as it slides along said channel.

21. The device of claim 18, further comprising:
a first channel disposed within said handpiece that said adjustment control protrudes therethrough;
a support wall disposed adjacent to said vacuum pickup tube; and
a second channel disposed within said support wall and adapted to guide a section of said sliding member as it slides along said second channel, wherein a user of said device controls the movement of said sliding member by moving said adjustment control along said first channel.

22. The device of claim 18, wherein said sliding member further comprises a channel disposed adjacent to said vacuum pickup tube, said first tab protrudes within and travels along said channel.

* * * * *